W. H. GRAHAM.
Stop-Cock Boxing.
No. 8,871 Reissued Aug. 26, 1879.
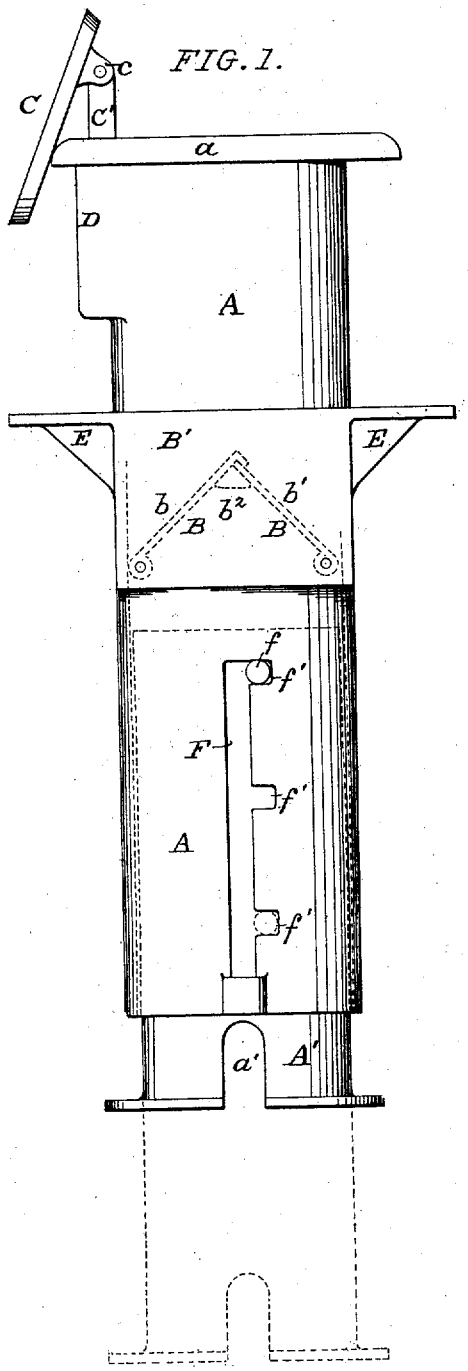
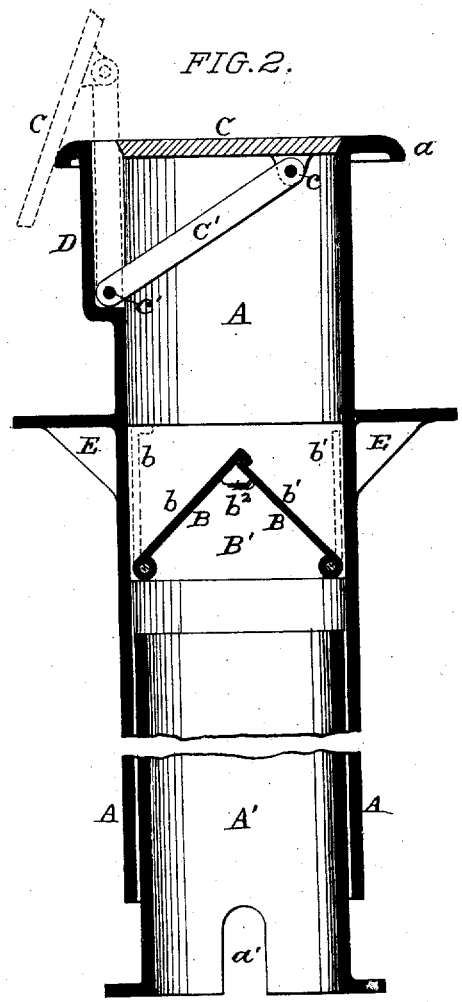
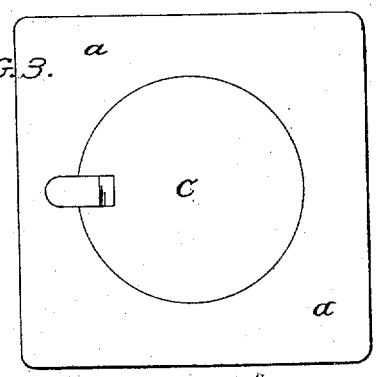
ATTEST:
Samuel W. Little
Frank Deffey
INVENTOR:
Wm. H. Graham
N. PETERS, PHOTO-LITHOGRAPHER, WASHINGTON, D. C.

UNITED STATES PATENT OFFICE.

WILLIAM H. GRAHAM, OF ST. LOUIS, MISSOURI.

IMPROVEMENT IN STOP-COCK BOXINGS.

Specification forming part of Letters Patent No. 143,978, dated October 28, 1873; Reissue No. 8,871, dated August 26, 1879; application filed June 30, 1879.

*To all whom it may concern:*

Be it known that I, WILLIAM H. GRAHAM, of the city of St. Louis, in the State of Missouri, have made certain new and useful Improvements in Stop-Cock Boxings; and I do hereby declare that the following is a full, clear, and exact description of the same, reference being had to the accompanying drawings, and to the letters of reference marked thereon.

The first part of this invention consists in the provision in a stop-cock boxing of a movable valve, gate, or partition placed within easy reach from the top of the boxing, and which, when closed, arrests any stones, dirt, or rubbish that accidentally enter the boxing at a point from whence they can readily and easily be removed by hand, and which prevents the same from lodging in the lower part of the boxing around and upon the shut-off cock.

Heretofore the great defect met with in the old-style boxing was the lodgment of stones, &c., in the lower portion of the boxing, which had to be removed before access could be had to the shut-off valve, which, owing to the smallness and length of the boxing, could not be reached with the hand, and had to be removed with a plumber's spoon, rendering it a long, difficult, and annoying operation, and often necessitating the digging up of the boxing to remove the obstructions. With my improvements, as above stated, these difficulties and annoyances are entirely prevented.

The second part of this invention consists in the provision in a stop-cock boxing of a cap or cover attached to the boxing by means of a hinge-link inside the boxing, which allows the permanent connection of the cap or cover to the boxing without the hinge-joint being exposed, as will hereinafter more fully appear.

In the drawings, Figure 1 is a side elevation. Fig. 2 is a vertical section. Fig. 3 is a top view, showing cap closed.

A is the upper or main portion of the stop-cock boxing, in which is arranged a movable valve, gate, or partition, B, which is positioned within easy reach from the top of the boxing, so that the operator can readily remove any accumulations of stones, dirt, or rubbish which may fall into the boxing and interfere with the opening or removal of said valve or gate when it is desired to obtain access to the water-shut-off valve at the bottom of the boxing.

It will be seen that any stones, dirt, or rubbish entering the boxing will be arrested and retained by the valve or gate B at a point from whence they can be readily and easily removed by hand.

The preferred manner of carrying out my invention is by means of a hinged valve, gate, or partition, B, preferably formed in two pieces, $b$ $b^1$, which meet at the center of the boxing, and rest against a cross supporting bar or stud, $b^2$, and are hinged at the sides of a square portion, B′, of the boxing, into which the two portions swing when the valve or gate is open, as shown in dotted lines in Fig. 2.

C is the cap or cover, which seats itself in the rim $a$ of the boxing and flush with the top of the same. This cap has pivot ears or lugs $c$, to which is connected the upper end of the hinge-link C′, the lower end of the link being pivoted, at $c'$, preferably within an offset-chamber, D, at the side of the boxing, the purpose of said chamber being to receive the hinge-link C′ when the cap or cover is raised, so that the said link will not remain as an obstruction in the interior of the boxing, and thus the full opening of the boxing is obtained.

E are the usual anchor-plates or lugs for more firmly holding the boxing in position in the ground.

The boxing is made adjustable, so as to adapt it to different depths, by being made in two portions. The part A′ slides in the part A, and is provided with the usual slots $a^1$ for the passage of the service-pipe; and, in order to secure the parts in any required position, I have formed the part A with a vertical slot, F, in which moves a pin or lug, $f$, on the side of the part A′, which pin or lug engages in one of a series of notches or recesses, $f'$, at one side of the vertical slot, to lock the parts in the desired position.

I claim—

1. The combination, with a stop-cock boxing having a cover, of a movable valve, gate, or partition placed within easy reach from the top of the boxing, for the purpose set forth.

2. The combination, with a stop-cock boxing having a cover, of a hinged valve, gate, or partition placed within easy reach from the top of the boxing, for the purpose set forth.

3. The combination, with a stop-cock boxing having a square chamber, B′, of the hinged valve or partition B, made in two portions, $b\ b^1$, substantially as and for the purpose set forth.

4. The combination, with a stop-cock boxing having a cover, of a valve or partition with a supporting bar or ledge, $b^2$, substantially as and for the purpose set forth.

5. The combination, with a stop-cock boxing, of the cap or cover C and hinge-link C′, substantially as and for the purpose set forth.

6. The combination, with a stop-cock boxing, of the cap or cover C, hinge-link C′, and offset-chamber D, substantially as set forth.

WILLIAM H. GRAHAM.

Witnesses:
SAMUEL H. LITTLE,
FRANK DEFFRY.